United States Patent [19]

MacMinn

[11] Patent Number: 4,961,038
[45] Date of Patent: Oct. 2, 1990

[54] TORQUE ESTIMATOR FOR SWITCHED RELUCTANCE MACHINES

[75] Inventor: Stephen R. MacMinn, Schenectady, N.Y.

[73] Assignee: General Electric Company, Schenectady, N.Y.

[21] Appl. No.: 421,885

[22] Filed: Oct. 16, 1989

[51] Int. Cl.⁵ ............................................. H02P 8/00
[52] U.S. Cl. ................................... 318/696; 318/685; 318/701
[58] Field of Search .................. 318/696, 685, 701

[56] References Cited

U.S. PATENT DOCUMENTS 4,661,756  4/1987  Murphy et al. ...................... 318/701
4,684,867  8/1987  Miller ................................... 308/701
4,707,650  11/1987  Bose ..................................... 318/685
4,739,240  4/1988  MacMinn et al. ................... 308/696

Primary Examiner—William M. Shoop, Jr.
Assistant Examiner—Saul M. Bergmann
Attorney, Agent, or Firm—Jill M. Breedlove; James C. Davis, Jr.; Marvin Snyder

[57] ABSTRACT

Apparatus for estimating torque generated by a switched reluctance machine utilizes a ROM table lookup scheme to generate a torque estimate based upon phase current and rotor position information. Each ROM address is accessed by digitizing and then combining sensed phase current and rotor position signals. Knowledge of the instantaneous torque output enables closed-loop torque control including appropriate adjustments of phase currents to reduce or eliminate torque pulsations.

10 Claims, 6 Drawing Sheets

TORQUE ESTIMATOR FOR SWITCHED RELUCTANCE MACHINES

FIELD OF THE INVENTION

The present invention relates generally to controls for switched reluctance machines. More particularly, the present invention relates to apparatus for indirectly determining electromagnetic torque output of a switched reluctance machine.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and the stator poles that are approaching each other. The current is switched off in each phase before the rotor poles nearest the stator poles of that phase rotate past the aligned position; otherwise, the magnetic force of attraction would produce a negative, or braking, torque. In a SRM, torque direction is independent of current direction. Therefore, in contrast to most other brushless machines which require bidirectional phase currents, a SRM power inverter can be configured to enable current flow in only one direction through a phase winding. Such an inverter generally employs one or more switching devices, such as transistors or thyristors, in series with each machine phase winding. Advantageously, this converter circuit topology prevents "shoot-through" current paths. Exemplary SRM converters are illustrated in commonly assigned U.S. Pat. No. 4,684,867, issued to T. J. E. Miller on Aug. 4, 1987, which is hereby incorporated by reference.

A SRM operates by switching the machine phase currents on and off in synchronism with rotor position. That is, by properly positioning the firing pulses relative to rotor angle, forward or reverse operation and motoring or generating operation can be obtained. Usually, the desired phase current commutation is achieved by feeding back the rotor position signal to a controller from a shaft angle transducer, e.g. an encoder or a resolver.

Disadvantageously, SRMs typically exhibit more torque pulsations than AC machines. Torque pulsations are a source of acoustic noise in the machine, which can result in mechanical resonances in a SRM system. Hence, it is desirable to smooth the torque generated by a SRM. To this end, it is desirable to have the capability in an electric motor drive system to measure the torque being produced in order to achieve closed-loop torque control.

OBJECTS OF THE INVENTION

Accordingly, it is an object of the present invention to provide apparatus for determining instantaneous electromagnetic torque output of a SRM so that appropriate adjustments to phase currents can be made in order to reduce or eliminate torque pulsations.

Another object of the present invention is to provide a method and apparatus for indirectly determining instantaneous torque output of a SRM by utilizing instantaneous phase current and rotor position angle measurements.

SUMMARY OF THE INVENTION

The foregoing and other objects are achieved in a new and improved apparatus for estimating electromagnetic torque output of a SRM. In one embodiment of the present invention, a Read Only Memory (ROM) lookup table is used to store torque versus rotor angular position data for specified values of phase current for each motor phase. Sensed phase current and motor position signals are digitized and combined to form an address of the corresponding ROM which provides an estimate of the torque being generated by the corresponding phase. The estimated phase torque signals for each phase are added together to produce an estimate of the total torque being generated by the SRM. Knowledge of the torque being generated at any instant enables the proper adjustment of phase currents to reduce or eliminate torque pulsations.

In an alternative embodiment, a single ROM is used to store torque versus rotor angular position and current data representative of one machine phase. A multiplexer is used to access the torque data for each phase. Advantageously, this alternative requires less memory than the previous embodiment; however, more logic circuitry is needed.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
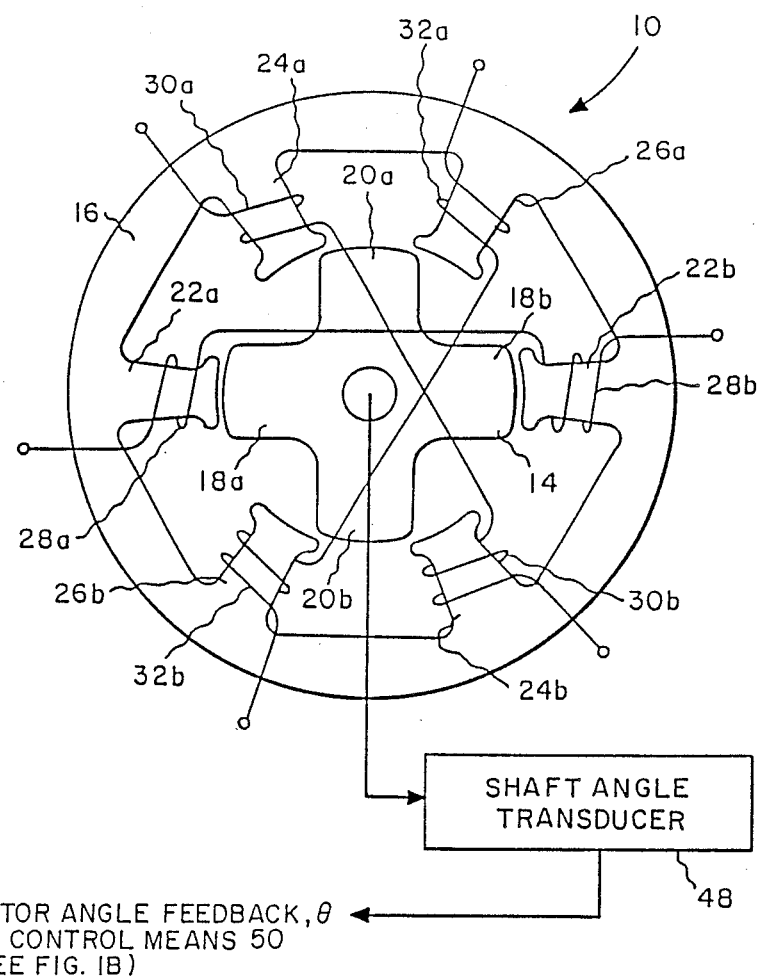
FIG. 1 is a schematic illustration of a conventional SRM drive.
Figure 1B:
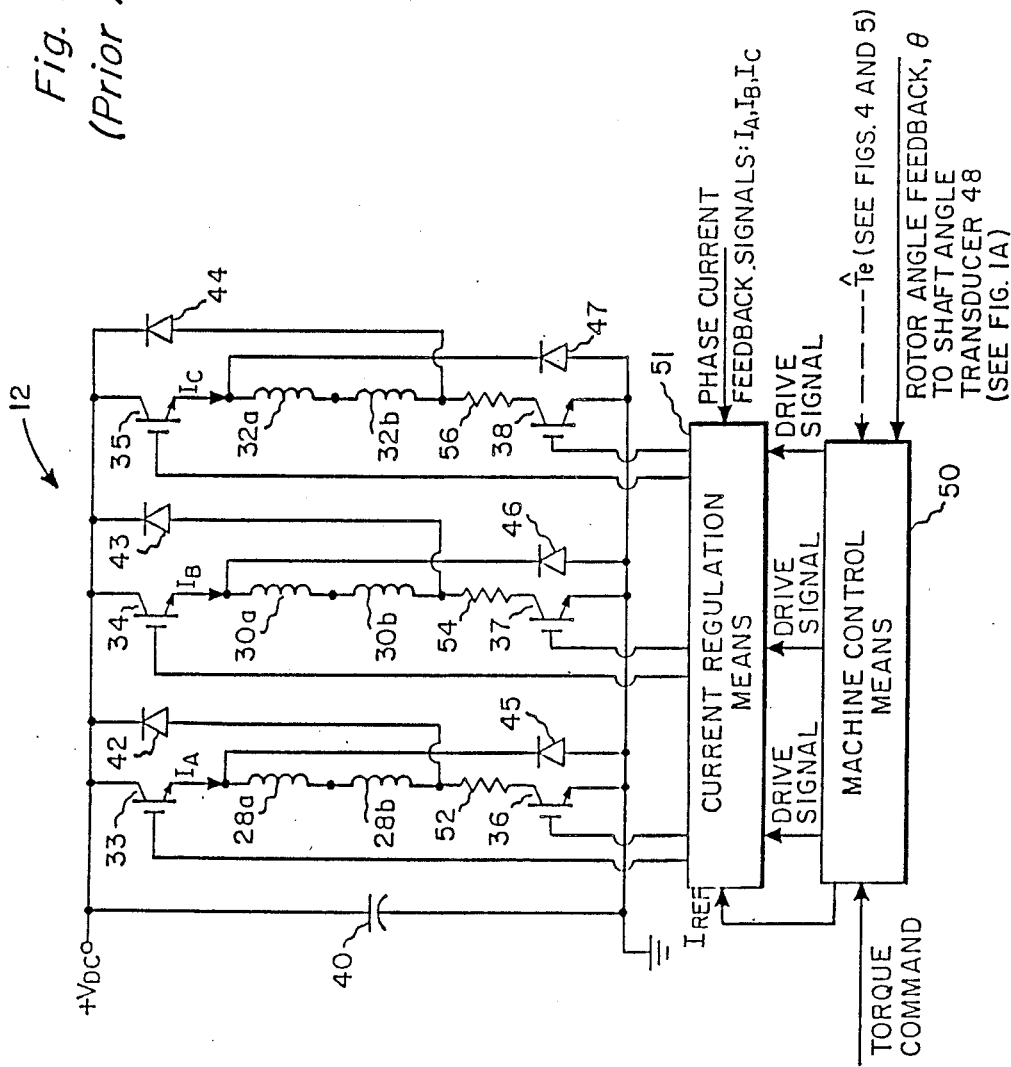

FIG. 1 shows a conventional switched reluctance machine drive configuration. By way of example, SRM 10 is illustrated as a three phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has a three pairs of diametrically opposite stator poles 22a-22b, 24a-24b and 26a-26b.

Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or in parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices each comprise an insulated gate bipolar transistor (IGT), but other suitable current switching devices may be used; for example, field effect transistors (FETs), gate turn-off thyristors (GTOs), or bipolar junction transistors (BJTs). Each phase winding is further coupled to a DC source, such as a battery or a rectified AC source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the DC source. Each series combination of the phase winding with two corresponding switching devices and two flyback diodes comprises one phase leg of inverter 12. The inverter phase legs are connected in parallel to each other and are driven by the DC source, which impresses a DC voltage $V_{DC}$ across the parallel inverter phase legs. Capacitance 40 is provided for filtering transient voltages from the DC source and for supplying ripple current to the inverter.

Typically, as shown in FIG. 1, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors shown in FIG. 1 as resistors 52, 54 and 56. Other suitable current sensors are well known in the art, such as: Hall effect current sensors; sensing transformers; and current sensing transistors, such as those sold under the trademark SENSEFET by Motorola Corporation or those sold under the trademark HEXSense by International Rectifier. Additionally, control means 50 provides a commanded reference current waveform $I_{REF}$ to current regulation means 51, to be hereinafter described. In well-known fashion, such as described in commonly assigned U.S. Pat. No. 4,739,240, issued to S. R. MacMinn and P. M. Szczsney on Apr. 19, 1988, which is hereby incorporated by reference, the control means provides firing signals to inverter 12 for energizing the machine phase windings in a predetermined sequence. Current regulation means 51 typically controls phase current magnitude by hysteresis band current chopping. In a SRM drive employing two switching devices per phase, as shown in FIG. 1, such a current chopping scheme involves providing predetermined upper and lower hysteresis band limits for commanded reference current waveform $I_{REF}$ to which the phase currents are continuously compared. At the start of a conduction interval for one phase (i.e., when a phase is excited for torque production), the switching devices in series with the corresponding phase winding are simultaneously switched on. With both switches thus conductive, current from the DC source builds in the phase winding until the upper limit of the hysteresis band is reached. At that point, both switching devices are turned off. Flyback or return diodes coupled to the phase winding provide a current path back to the DC source. When the phase current decreases to the lower limit of the hysteresis band, the switching devices are switched on again, and the process repeats. This process is commonly referred to as pulse width modulation (PWM) or current chopping. Such a hysteresis band current chopping strategy is described in U.S. Pat. No. 4,739,240, cited hereinabove.

In a SRM, torque magnitude is controlled by varying the magnitude of phase currents. Torque direction is controlled by varying the application of current pulses with respect to rotor position. At constant current, the torque $T_e$ generated by a SRM is given by:

$$T_e = \tfrac{1}{2} I^2 \frac{dL}{d\theta}$$

where I is the phase current, L is the phase inductance, and $\theta$ is the rotor angle.

Figure 2:
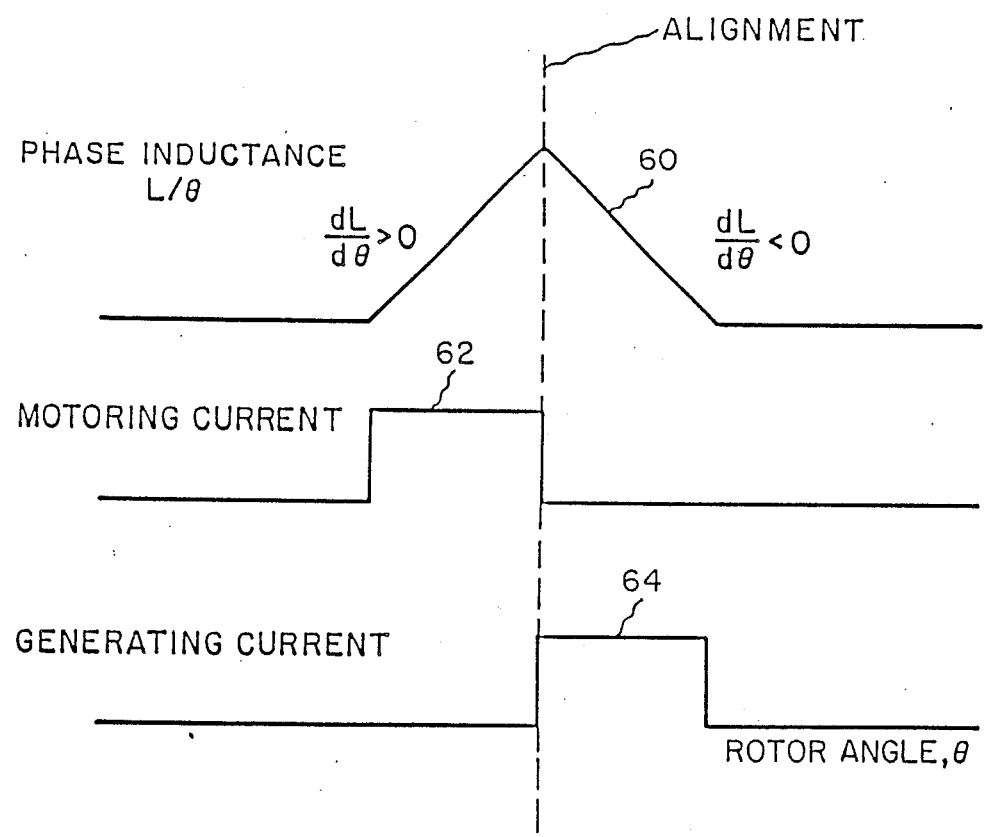
FIG. 2 graphically illustrates the idealized inductance profile as a function of rotor angular position for a stator pole pair of a typical SRM and the corresponding idealized stator phase currents for motoring and generating modes of operation.

FIG. 2 shows the idealized inductance profile 60 of a stator pole pair (e.g. Phase A) with respect to rotor angular and position. In accordance therewith, graphical representations of idealized stator phase motoring and generating currents 62 and 64, respectively, are also illustrated. If the current is on while the rotor and stator poles are approaching alignment, as illustrated by current waveform 62, then $dL/\theta$ is greater than zero and the torque is positive, signifying motoring operation. Alternatively, if the current is on when the poles are being pulled away form alignment, as illustrated by current waveform 64, then $dL/d\theta$ is less than zero and the torque is negative, corresponding to generating, or braking, operation. At high speeds, the motor back electromotive force (EMF) opposes the rise and fall of current in the phase, making it necessary to advance the current pulse to maintain maximum torque production. Turning the pulse on earlier allows the current to rise against a lower back EMF, and turning it off sooner allows the current to decay before the rotor passes alignment, thereby preventing production of braking torque during motoring operation.

Figure 3:
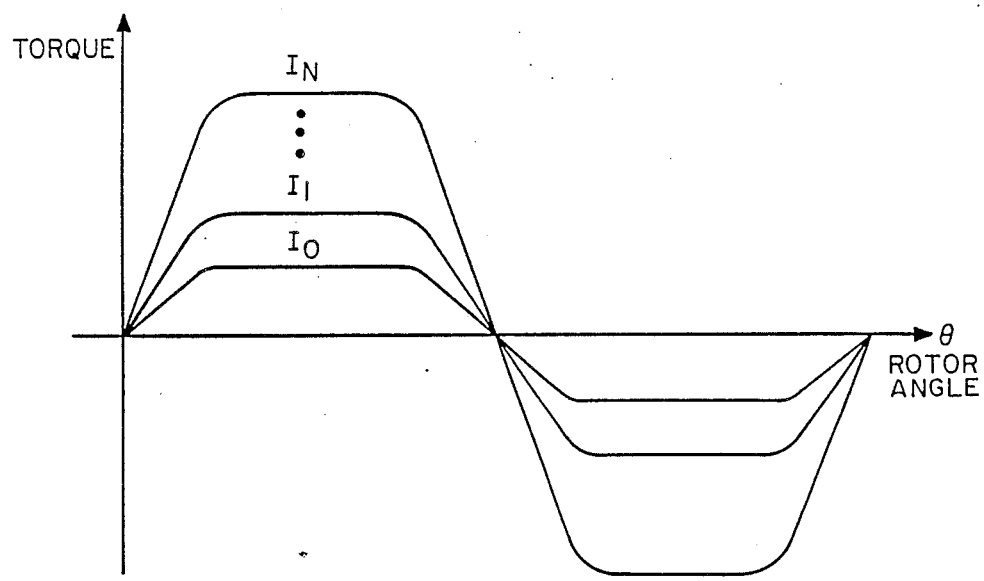
FIG. 3 is a graphical illustration of torque versus rotor angular position for a SRM at phase currents $I_0$, $I_1 \ldots I_N$.

FIG. 3 graphically illustrates torque versus rotor position for a typical SRM at fixed phase currents $I_0$, $I_1$. . . $I_N$. As described hereinabove, torque is positive during motoring operation and negative during generating operation.

Figure 4:
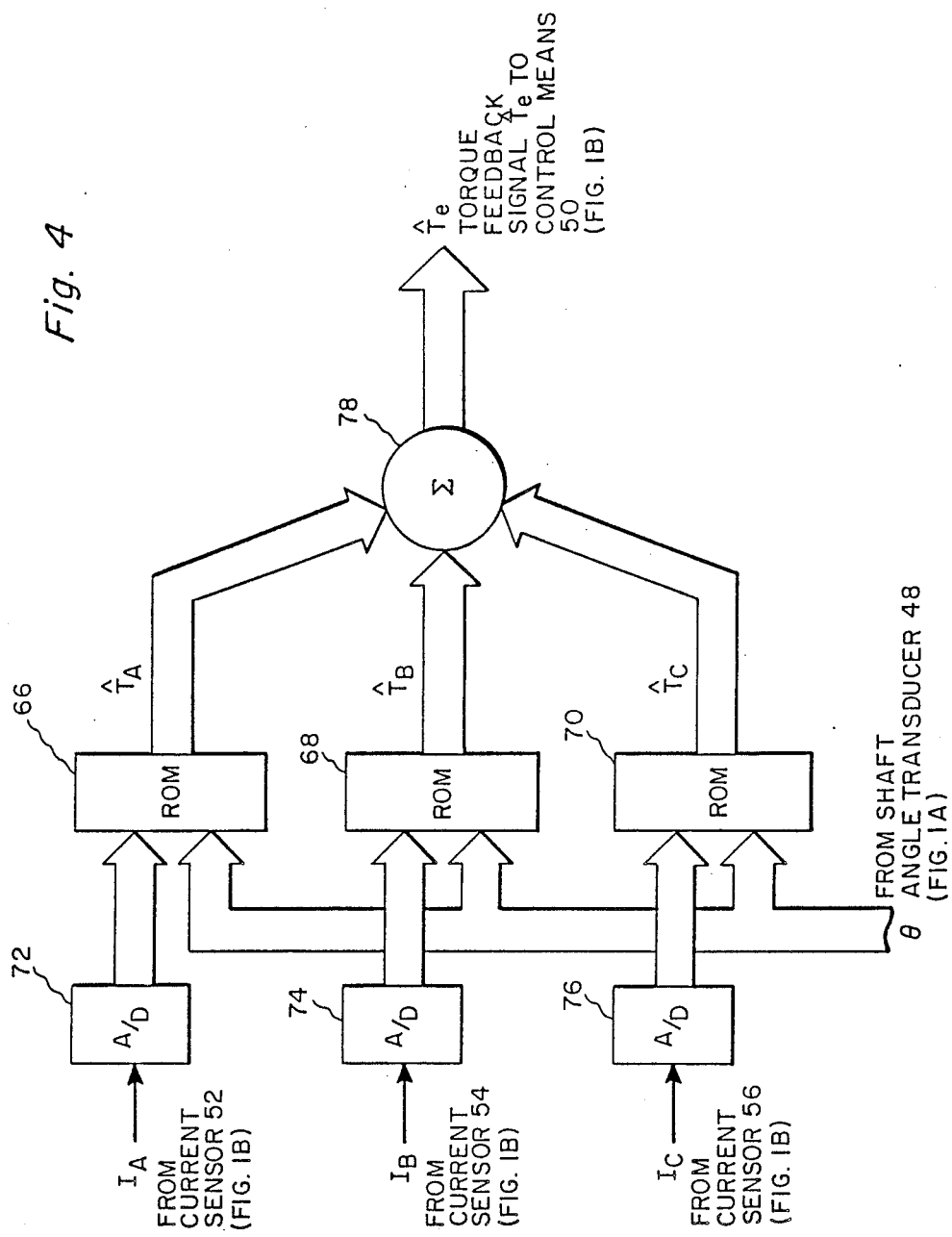
FIG. 4 is a block diagram of apparatus useful for estimating SRM torque output according to one embodiment of the present invention.

In accordance with one embodiment of the present invention, FIG. 4 is a simplified, functional block diagram illustrating apparatus for estimating SRM torque output. For a particular SRM and for each motor phase, data representing torque versus rotor angle and position at specified phase currents are stored in a Read Only Memory (ROM) 66, 68 and 70 as a look-up table. Such data are preferably collected from measurements or are calculated based on the geometry of the particular SRM. Analog-to-digital (A/D) converters 72, 74 and 76 receive sensed phase current signals $I_A$, $I_B$ and $I_C$, respectively, from current sensors 52, 54 and 56, respectively. A/D converters 72, 74 and 76 digitize the respective phase currents so as to form part of the ROM address corresponding thereto. The other part of the respective ROM address is generated by digitizing the rotor angular position signal $\theta$. The output signal of each respective ROM 66, 68 and 70 represents an estimate of the torque $T_A$, $T_B$ and $T_C$, respectively, being generated by the corresponding phase winding. These individual torque estimates $T_A$, $T_B$ and $T_C$ are added in a summer 78 to produce an estimate of the total torque $T_e$ being generated by the SRM. The estimated total torque signal $T_e$ is employed as a torque feedback signal to a control means in a SRM drive system such as control means 50 of FIG. 1. In particular, the estimated torque signal $T_e$ can be used to modulate the motor phase current commands to reduce or eliminate torque pulsations.

Figure 5:
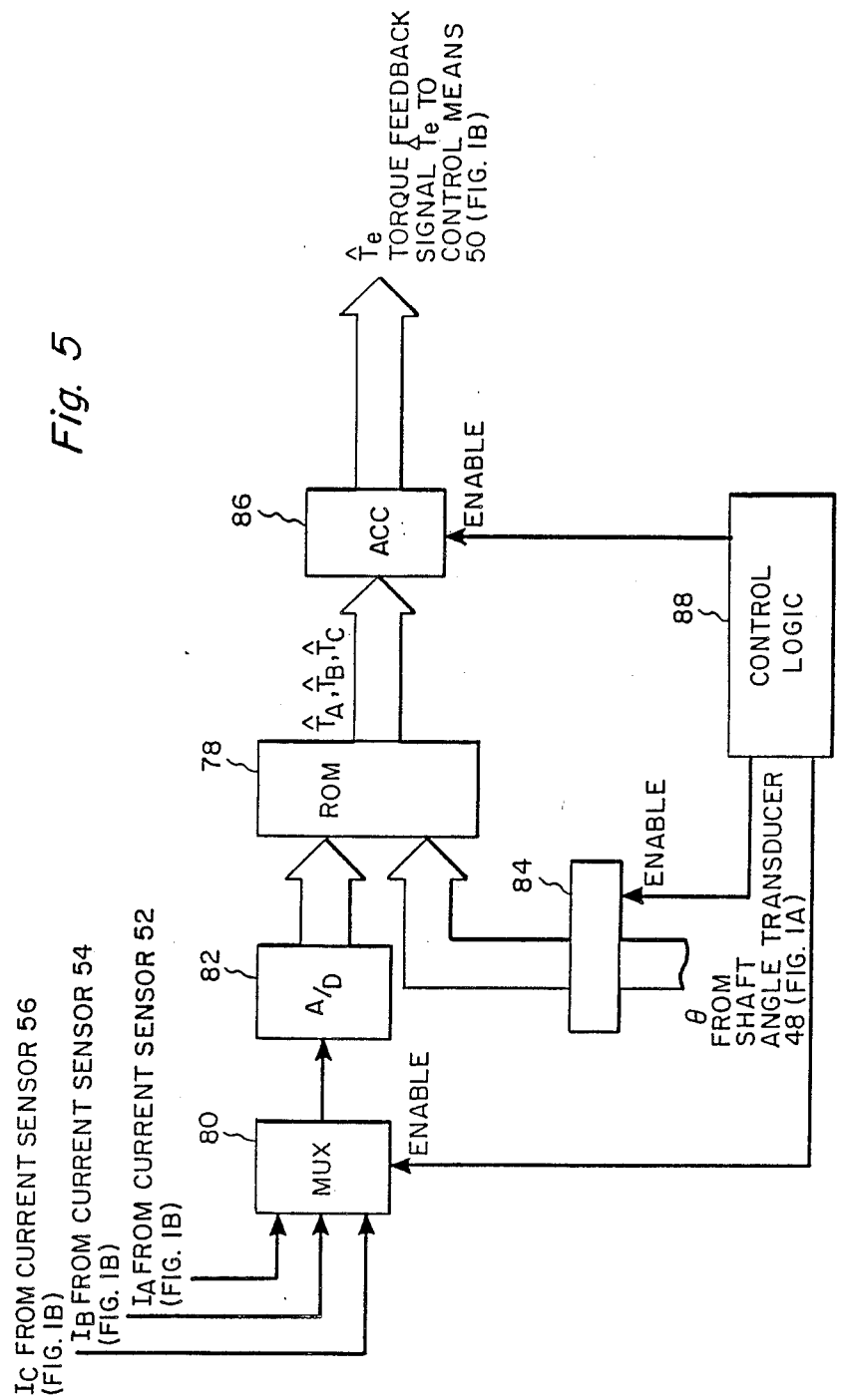
FIG. 5 is a block diagram of apparatus useful for estimating SRM torque output according to an alternative embodiment of the present invention.

FIG. 5 is a block diagram of an alternative embodiment of a SRM torque estimator according to the present invention. A single ROM 78 is used to store torque versus rotor angular position and current data for one phase of the SRM. Each sensed phase current signal $I_A$, $I_B$ and $I_C$ is accessed sequentially during its respective conduction interval by an analog multiplexer 80. The analog output signal from multiplexer 80 is digitized in an A/D converter 82. This digital current signal is combined with the digital rotor angular position signal $\theta$ to form the corresponding ROM address. An angle phase shifter 84 comprising, for example, a digital adder circuit of a type well-known in the art, is used to phase shift each rotor angular position signal with respect to a fixed reference by an amount equal to $$\frac{360°}{N_r \cdot N_p'}$$

where $N_r$ is the number of rotor poles and $N_p$ is the number of motor phases. In this way, a single look-up table stored in ROM 78 can be used to make a torque estimate for all of the motor phases. The instantaneous torque signal $T_A$, $T_B$ and $T_C$ for each phase is provided from ROM 78 to arithmetic circuitry 86 wherein the estimated torque signals $T_A$, $T_B$ and $T_C$ are added together to generate an estimate of the total torque $T_e$ being generated by the SRM. The total estimated torque signal $T_e$ is employed as a torque feedback signal to a control means in a SRM drive system, such as control means 50 of FIG. 1. A control logic circuit 88 provides the enable signals to multiplexer 80, angle phase shifter 84 and arithmetic circuitry 86. More specifically, the control logic circuit sequentially samples each of the phase currents via multiplexer 80, shifts the rotor angle by the aforesaid amount from the fixed reference through phase shifter 84, and controls operation of arithmetic circuitry 86. Preferably, control logic 88 and arithmetic circuitry (ACC) 86 are integrated into a single gate array.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. Apparatus for estimating electromagnetic torque output of a switched reluctance machine having at least one phase, comprising:
   rotor position sensor means for sensing the instantaneous position of said rotor and generating a rotor position signal representative thereof;
   current sensor means for sensing the instantaneous phase current in each respective phase of said switched reluctance motor and generating a phase current signal representative thereof;
   torque look-up table means responsive to said rotor position signal and each said phase current signal for generating a phase torque signal corresponding thereto; and
   means for combining each said phase torque signals to produce a total torque signal.

2. The apparatus of claim 1 wherein said torque look-up table means comprises a Read Only Memory corresponding to each respective motor phase, each said Read Only Memory storing torque versus rotor position and current data for the corresponding phase of said switched reluctance motor.

3. The apparatus of claim 1 wherein said torque look-up table means comprises a Read Only Memory for storing torque versus rotor position and current data for one phase of said switched reluctance motor, said apparatus for estimating electromagnetic torque output further comprising:
   multiplexing means for sequentially selecting each respective phase current signal; and
   angle shifting means for phase shifting said rotor position signal by a predetermined amount so that said one phase comprises a fixed reference for deriving said phase torque signals for the respective motor phases.

4. The apparatus of claim 2, further comprising means for digitizing said rotor position signal and each said phase current signal, the digitized signals being combined to form an address of the respective Read Only Memory.

5. The apparatus of claim 3, further comprising means for digitizing said rotor position signal and each said phase current signal, the digitized signals being combined to form an address of said Read Only Memory.

6. A method for estimating electromagnetic torque output of a switched reluctance machine, comprising the steps of:
   sensing the instantaneous position of said rotor and generating a rotor position signal representative thereof;
   sensing the instantaneous phase current in each respective phase of said switched reluctance motor and generating a phase current signal representative thereof;
   providing a look-up table means for storing torque versus rotor position and current data for said switched reluctance motor;
   generating a phase torque signal from said look-up table means for each respective phase corresponding to said rotor position signal and said phase current signal; and
   combining said phase torque signals to produce a total torque signal.

7. The method of claim 6 wherein the step of providing a look-up table comprises:
   storing torque versus rotor position and current data for each respective phase of said motor in a separate respective Read Only Memory.

8. The method of claim 6 wherein the step of providing a look-up table comprises:
   storing torque versus rotor position and current data for one phase of said motor in a Read Only Memory, and said method further comprises utilizing said one phase as a fixed reference for deriving said phase torque signals for the respective motor phases.

9. The method of claim 7, further comprising the steps of digitizing said rotor position signal and each said phase current signal, and combining the digitized signals to form an address of the corresponding Read Only memory.

10. The method of claim 8, further comprising the steps of:
digitizing said rotor position signal and each said phase current signal;
combining the digitized signals to form an address of said Read Only Memory;
sequentially accessing each respective phase current signal; and
phase shifting said rotor position signal by a predetermined amount so that said one phase comprises a fixed reference for deriving said phase torque signals for the respective motor phases.

* * * * *